R. TURNER.
Flour Bolt.
No. 105,618.
Patented July 19, 1870.
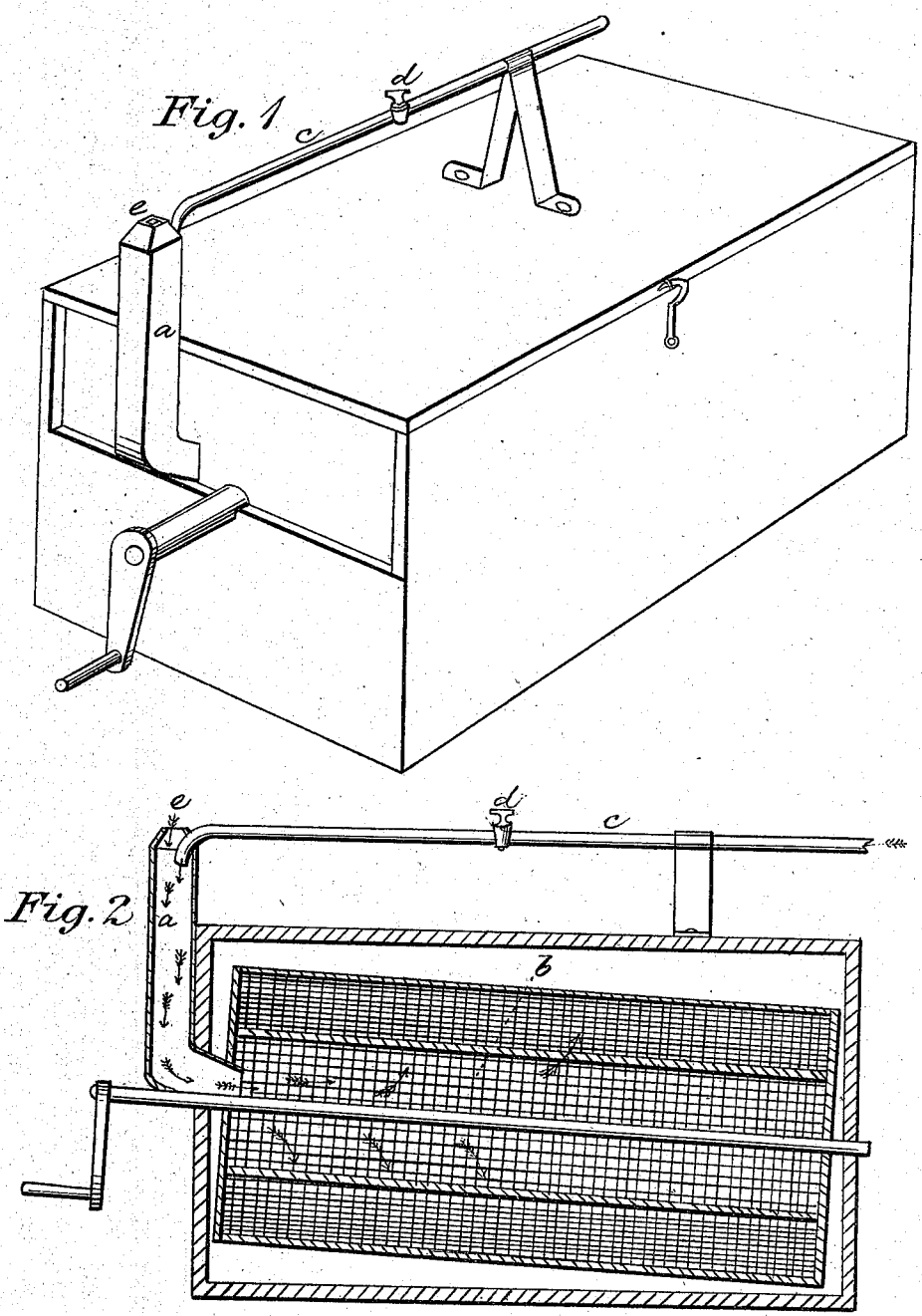

United States Patent Office.

ROBERT TURNER, OF ROCHESTER, NEW YORK, ASSIGNOR TO TURNER & LUTES, OF SAME PLACE.

Letters Patent No. 105,618, dated July 19, 1870.

IMPROVED FLOUR-BOLT ATTACHMENT.

The Schedule referred to in these Letters Patent and making part of the same

*To all whom it may concern:*

Be it known that I, ROBERT TURNER, of Rochester, in the county of Monroe and State of New York, have invented a new and useful Improvement in Flour-Bolts; and I do hereby declare the following to be a full, clear, and exact description thereof, reference being had to the accompanying drawings of the same, which make part of this specification, and in which—

Figure 1 represents a view, in perspective, of a flour-bolt embracing my improvements.

Figure 2 represents a longitudinal section of the same.

In the accompanying drawings—

*a* represents a vertical spout, which conducts the flour from the grinding-burs into the bolting-reel *b*, which may be of any suitable construction, mounted upon a horizontal shaft, and revolved by suitable gearing.

I am aware that a series of perforated tubes has been arranged around and revolves with the shaft of the bolting-reel, through which air is forced into the bolt from a supplying-chamber, and that the shaft of the reel has also been made tubular and perforated for the same purpose; and while these devices greatly increase the weight of the bolt, which is a disadvantage, they have been found to be very objectionable on account of the clogging of the perforations and the choking of the passages through which the air is supplied to the interior of the bolt, because the tubular shaft, as well as the series of tubes, is always partly or entirely filled with the meal, which constantly sifts into them through their perforations, so that, as they revolve with the bolt, the flour in them acts, as it were, as a valve, and closes the perforations to a very great extent. Moreover, in such arrangements of interior ventilating tubes, there is no provision for cleaning them out when required, except by taking the bolt to pieces, and from these and other causes interior ventilating tubes have proved of no useful advantage.

By my improvements these objections are completely overcome; and they consist in the arrangement of an air-pipe, so as to intercept the feed-spout outside of and some distance above its connection with the bolt, in such manner that the blast of air will strike the flour in its descent, and spread and loosen it, so as to separate the bran therefrom to a very great extent before it reaches the bolt. It also has the effect of cooling and drying the flour before it strikes the bolting-cloth, and of driving it into the revolving reel, instead of delivering it at the end. This is also a great advantage resulting from my improvement, because the flour, when entering the screen by the momentum of its descent only, gathers in a heap, and hence the meshes of the receiving end of the screen are always clogged from the dampness of the flour.

The air is forced into and through the pipe *c*, and into and through the feed-spout *a*, in direct contact with the flour, while descending in a thin sheet, and within a narrow spout, so that it cannot spread until it reaches the mouth of the spout, and thus acts directly upon the falling flour, and carries it, with the force of the blast, into the bolt, separating its particles, and spreading it out, as it were, into a fine mist, which greatly facilitates the bolting of the flour, and largely increases its product, and, being comparatively cooled and dried before entering the bolt, the meshes of the latter are, therefore, prevented from clogging, and the lightness and durability of the cloth greatly increased.

The air-tube *c* is provided with a stop-cock, *d*, by which the strength of the blast from the fan-blower may be regulated as occasion may require, and according to the condition of the grain being ground.

The fan-blower may be located in any convenient place, and the air-pipe therefrom extended up over the bolt, to form a junction with the feed-spout.

Having described my improvements,

I claim—

The arrangement of the air-supplying tube *c* above the bolt, in combination with the feed-spout *a*, with which it forms a junction, for the purpose of subjecting the flour in its descent to a continuous sharp blast of air, and driving it into the bolt, as herein described.

ROBERT TURNER.

Witnesses:
GEO. FRAUENBERGER,
JOHN LUTES.